US 8,239,519 B2

(12) United States Patent
Jang et al.

(10) Patent No.: US 8,239,519 B2
(45) Date of Patent: Aug. 7, 2012

(54) COMPUTER-IMPLEMENTED METHODS, SYSTEMS, AND COMPUTER PROGRAM PRODUCTS FOR AUTONOMIC RECOVERY OF MESSAGES

(75) Inventors: Soobaek Jang, Hamden, CT (US); Hung Q. Pham, Waterbury, CT (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1154 days.

(21) Appl. No.: 11/674,185

(22) Filed: Feb. 13, 2007

(65) Prior Publication Data
US 2008/0195891 A1 Aug. 14, 2008

(51) Int. Cl.
G06F 15/173 (2006.01)
(52) U.S. Cl. ........................................ 709/224; 709/227
(58) Field of Classification Search .................. 709/223, 709/224
See application file for complete search history.

(56) References Cited

U.S. PATENT DOCUMENTS

| | | | | |
|---|---|---|---|---|
| 2002/0112007 A1* | 8/2002 | Wood et al. | | 709/206 |
| 2002/0198984 A1* | 12/2002 | Goldstein et al. | | 709/224 |
| 2003/0023684 A1* | 1/2003 | Brown et al. | | 709/204 |
| 2004/0215998 A1 | 10/2004 | Buxton et al. | | |
| 2005/0060374 A1 | 3/2005 | Phillips | | |
| 2005/0177759 A1 | 8/2005 | Cabrera et al. | | |
| 2005/0267941 A1* | 12/2005 | Addante et al. | | 709/206 |

FOREIGN PATENT DOCUMENTS
JP 2001184309 A 7/2001
* cited by examiner

*Primary Examiner* — Wing Chan
*Assistant Examiner* — Andrew Woo
(74) *Attorney, Agent, or Firm* — Cantor Colburn LLP; Gail Zarick

(57) ABSTRACT

Computer-implemented methods, systems, and computer program products for autonomic recovery of messages are provided. A computer-implemented method includes creating a temporary file for a communication session. The temporary file identifies a communication partner to the communication session and a start time of the communication session. The computer-implemented method also includes monitoring the communication session. Upon the occurrence of a triggering event, the computer-implemented method includes logging the time of the triggering event in the temporary file, logging the time of any messages received after the time of the triggering event, and storing the messages in the temporary file. The computer-implemented method further includes presenting the messages in response to initiation of another communication session with the communication partner.

17 Claims, 3 Drawing Sheets

COMPUTER-IMPLEMENTED METHODS, SYSTEMS, AND COMPUTER PROGRAM PRODUCTS FOR AUTONOMIC RECOVERY OF MESSAGES

BACKGROUND OF THE INVENTION

The present disclosure relates generally to electronic messaging and, in particular, to computer-implemented methods, systems, and computer program products for providing autonomic recovery of messages.

Electronic communications, such as email, instant messaging, and text messaging have become ubiquitous in today's fast-paced society. While instant messaging offers much convenience, it is not without drawbacks. For example, unlike email, unread instant messages can become lost when an end user's device/messaging client is shut down (or crashes) prior to receipt of the instant message.

The end user may not be aware of these undelivered messages. Moreover, the sender of the messages may assume that the end user has read the undelivered message.

Thus, even though instant messaging systems provide end-to-end "level" message delivery, constructively, these messaging systems offer end-to-point delivery until the receiving party actually reads the messages. This drawback may lead to miscommunication, confusion, and distrust of communication relationships.

What is needed, therefore, is a way to provide autonomic recovery of messages that are lost when a disruption of a communication session has occurred that prevents delivery of messages and provides a notification of the recovered message.

BRIEF SUMMARY OF THE INVENTION

Embodiments of the invention include computer-implemented methods for autonomic recovery of messages. A computer-implemented method includes creating a temporary file for a communication session. The temporary file identifies a communication partner to the communication session and a start time of the communication session. The computer-implemented method also includes monitoring the communication session. Upon the occurrence of a triggering event (such as no activity on the message session of the message receiver for a pre-defined time interval, manual shutdown or log off at the communications device), the computer-implemented method includes logging the time of the triggering event in the temporary file, logging the time of any messages received after the time of the triggering event, and storing the messages in the temporary file. The computer-implemented method further includes presenting the messages in response to initiation of another communication session with the communication partner.

Additional embodiments include systems for autonomic recovery of messages. A system includes a computer processor executing a messaging client. The computer processor also implements a message recovery application that is in communication with the messaging client. The message recovery application performs a method. The method includes creating a temporary file for a communication session. The temporary file identifies a communication partner to the communication session and a start time of the communication session. The method also includes monitoring the communication session. Upon the occurrence of a triggering event, the method includes logging the time of the triggering event in the temporary file, logging the time of any messages received after the time of the triggering event, and storing the messages in the temporary file. The method further includes presenting the messages in response to initiation of another communication session with the communication partner.

Further embodiments include computer program products for autonomic recovery of messages. A computer program product includes instructions for causing a computer to implement a method. The method includes creating a temporary file for a communication session. The temporary file identifies a communication partner to the communication session and a start time of the communication session. The method also includes monitoring the communication session. Upon the occurrence of a triggering event, the method includes logging the time of the triggering event in the temporary file, logging the time of any messages received after the time of the triggering event, and storing the messages in the temporary file. The method further includes presenting the messages in response to initiation of another communication session with the communication partner.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Computer-implemented methods, systems, and computer program products for autonomic recovery of messages are provided in exemplary embodiments. Message recovery actions are implemented in response to a disruption of a communication session. The recovery actions are effectuated, in part, by saving incoming communications to a temporary file that is accessible to a messaging client. The message recovery actions may be employed for any type of communications, e.g., instant messaging, text messaging, and chat room messaging, to name a few.

Figure 1:
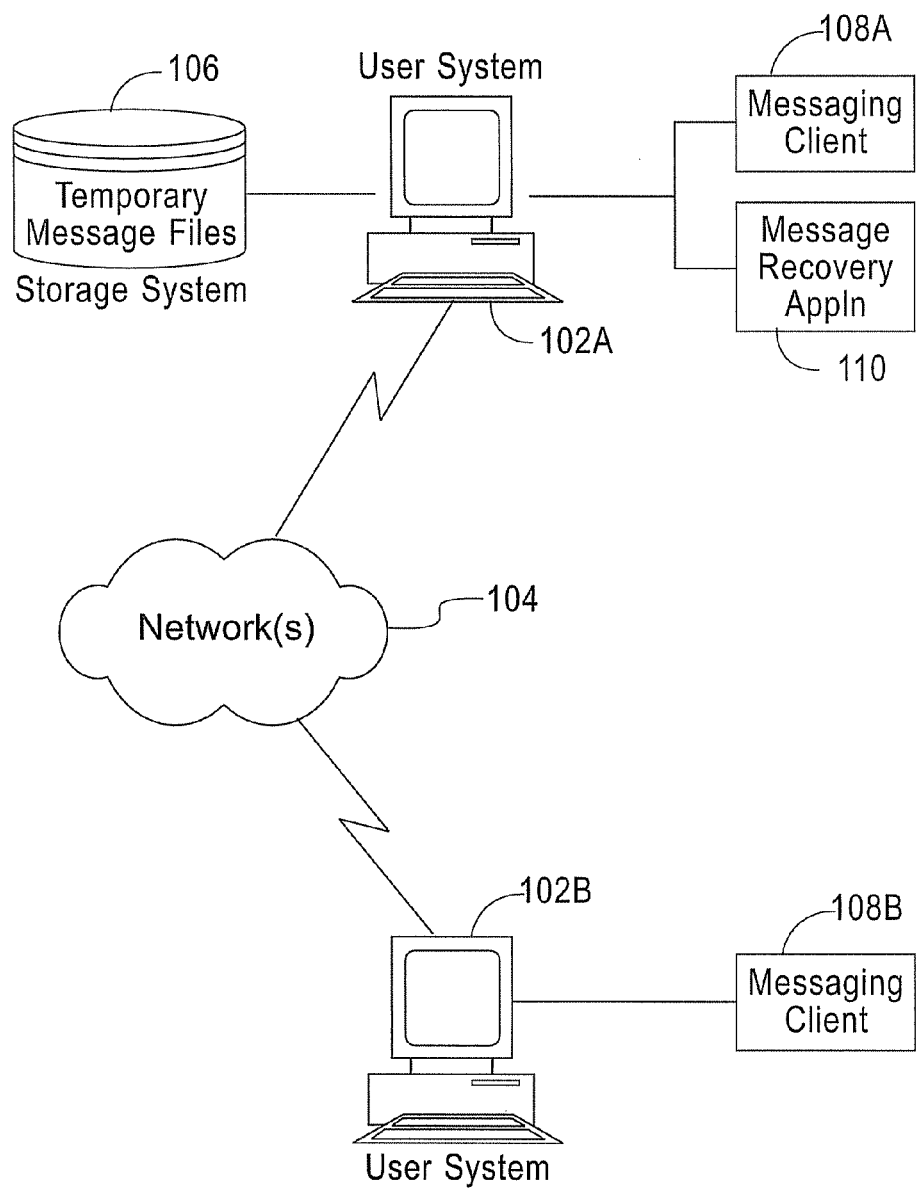
FIG. 1 depicts a system upon which autonomic recovery of messages may be implemented in accordance with exemplary embodiments.

Turning now to FIG. 1, a system upon which the autonomic message recovery functions may be implemented will now be described in exemplary embodiments. The system depicted in FIG. 1 includes user systems 102A-102B through which users at one or more geographic locations may communicate. The user systems 102A-102B are coupled to one or more network(s) 104. Each user system 102A, 102B may be implemented using a general-purpose computer executing a computer program for carrying out the processes described herein. The user systems 102A-102B may be personal computers (e.g., a lap top, a personal digital assistant) or host attached terminals. If the user systems 102A-102B are personal computers, the processing described herein may be shared by a user system 102A, 102B and a host system (not shown) (e.g., by providing an applet to the user system 102A, 102B) where network 104 includes e.g., a local area network (LAN).

The user systems 102A-102B implement messaging clients 108A-108B, respectively. The messaging clients may include any type of communications applications including, e.g., electronic mail (email), instant messaging (IM), chat room applications, etc. In exemplary embodiments, the user system 102A executes a message recovery application 110 for implementing autonomic recovery of messages resulting from communications sessions occurring via the messaging client 108A. While the messaging client 108A and message recovery application 110 are shown as separate applications, it will be understood that the applications may be integrated as a single messaging tool for performing both messaging functions and the message recovery functions described herein.

The networks 104 may include any type of known networks including, but not limited to, a wide area network (WAN), a local area network (LAN), a global network (e.g. Internet), a virtual private network (VPN), and an intranet. The networks 104 may be implemented using a wireless network or any kind of physical network implementation known in the art. A user system 102A, 102B may be coupled to one another through multiple networks (e.g., intranet and Internet) so that not all user systems 102A, 102B are in communication through the same network. One or more of the user systems 102A, 102B may be connected to the networks 104 in a wireless fashion.

In exemplary embodiments, user system 102A includes a storage system (component) 106. The storage system 106 includes a data repository with data relating to managing temporary files produced and utilized by the message recovery application 110. Storage system 106 may be implemented using a variety of devices for storing electronic information. It is understood that the storage system 106 may be implemented using memory contained in the user system 102A or that it may be a separate physical device. Information stored in the storage system 106 may be retrieved and manipulated via the user system 102A.

As indicated above, autonomic recovery of messages is provided for messages that are undelivered due to a disruption of a communication session. The disruption may be a system or application failure at a communications device or may be a manual shutdown or log off at the communications device. The message recovery application 110 may include a user interface for enabling an end user to select and/or configure settings that specify the handling of incoming messages affected by the disruption. Default settings may also be available via the message recovery application 110 user interface. These settings are described further herein.

Figure 2:
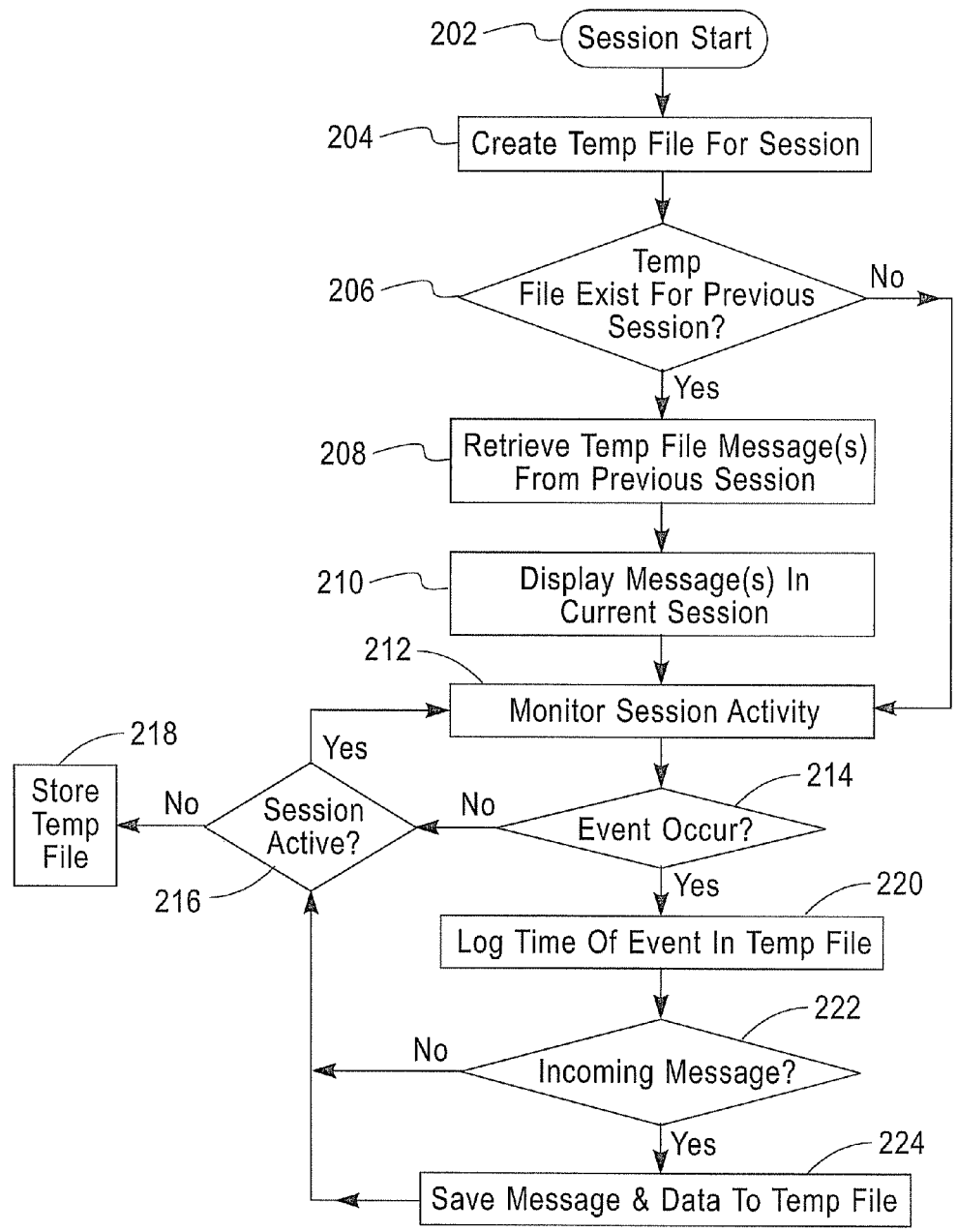
FIG. 2 is a flow diagram describing a process for providing autonomic recovery of messages in accordance with exemplary embodiments.

Turning now to FIG. 2, a flow diagram describing a process for providing autonomic recovery of messages will now be described in accordance with exemplary embodiments. For purposes of illustration, the processes described in FIG. 2 are directed to instant messaging communications.

A user at user system 102A initiates an active communication session via messaging client 108A with user system 102B at step 202. An active communication session is one in which two or more user systems utilize a communications channel for exchanging data.

Figure 3:
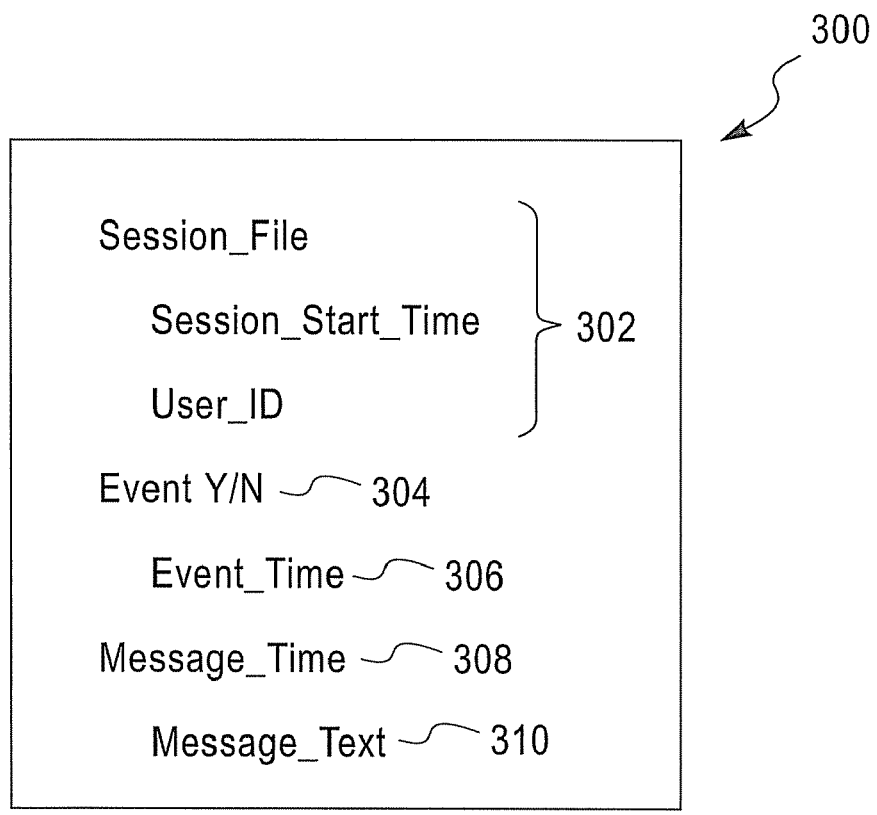
FIG. 3 depicts a temporary file created via the autonomic message recovery functions in exemplary embodiments.

At step 204, a temporary file is created for the communication session by the message recovery application 110. A temporary file 300 is shown generally in FIG. 3. The temporary file 300 is identified by the particular communication session and an identifier associated with the communication partner (e.g., user system 102B). The communication session may be referenced in the temporary file 300, e.g., by the start time of the session. As shown in FIG. 3, temporary file 300 includes fields 302 for identifying a communication session and communication partner (i.e., USER_ID).

At step 206, it is determined whether a temporary file already exists for a previous session that transpired between the user of user system 102A and the communication partner (e.g., user system 102B). The temporary file may have been created from an earlier communication session in which a disruption occurred. A temporary file may be created at the initiation of a communication session and then saved in response to a triggering event as described further herein.

The message recovery application 110 searches the temporary files stored in storage system 106 by the USER_ID field 302 in order to determine whether a temporary file exists for a previous communication session with respect to the user system 102B. A temporary file may exist for a previous communication session when messages delivered to user system 102A were not received by, or were received but potentially unread by, the user of user system 102A (e.g., the user system 102A was shut down before the message was received, the messaging client 108A was shut down before the message was received, and/or the user system 102A crashed before the message was received).

If no temporary file exists for a previous session, the process continues at step 212. Otherwise, if a temporary file exists, the message recovery application 110 retrieves the messages from the temporary file, along with related data (e.g., timestamp of message) at step 208, and displays the messages in the active communication session window (e.g., on a display window of the user system 102A via the messaging client 108A) at step 210.

At step 212, the message recovery application monitors the active communication session for activity. The activity monitored may include the exchange of communications between/among user systems, changes in the active status of the communication session (e.g., users sign off of session), and other actions.

At step 214, it is determined whether a triggering event has occurred for the communication session. A triggering event may include, e.g., system/application idle for a pre-defined time, sign off of the messaging client 108A, log off of the user system 102A, system failure (crash) of the user system 102A, or other event that prevents the user of user system 102A from receiving messages from the communication partner for the session.

If no triggering event has occurred, it is next determined whether the session is still active (e.g., whether the communication partner of user system 102B signed off of the messaging client 108B, thereby ending the session) at step 216. If the session is still active, the process returns to step 212 where the session continues to be monitored. Otherwise, if the session is not active at step 216, the temporary file is stored in storage system 106 at step 218. The message recovery application 110 may alternatively decide not to store the temporary file if no event has occurred (as there are no messages to save). This may be accomplished via a field 304 in temporary file 300, which refers to a flag that is not set when no event has occurred for the session.

Returning back to step 214, if a triggering event has occurred, the message recovery application 110 logs the time of the event in the temporary file (in EVENT_TIME field 306) at step 220 and sets the EVENT flag 304 in temporary file 300.

At step 222, it is determined whether an incoming message is received by the communication partner of the session. If not, the process returns to step 216. Otherwise, the timestamp of the message and the message content are saved to the temporary file 300 (e.g., via MESSAGE_TIME field 308, and MESSAGE_TEXT field 310, respectively) at step 224. The process then returns to step 216 whereby the active status of the session is again verified.

As indicated above, the message recovery application 110 may include a user interface for enabling an end user to configure or select settings for determining how incoming messages are handled in response to a triggering event. These settings further specify how a triggering event may be defined.

As with instant messaging applications, oftentimes a message is received and displayed at the receiving end user system during an active session but the recipient may not have read the message for various reasons (e.g., prior to the message delivery, the user walked away from the computer, the message was then delivered and displayed, but after a period of inactivity, the computer timed out before the user saw the message). In other situations, the user may not receive the message because he/she shuts down the messaging client application while the message is in transit. Alternatively, the user may not receive the message because the computer device suffers a system/application failure during a communication session. In the event of any of these situations, the message recovery application 110 enables a user to configure or select settings that specify how to handle incoming/received but unread messages.

The user interface may prompt or instruct the user to define triggering events that will cause the message recovery application 110 to take appropriate action with respect to the incoming/received messages. For example, user-configurable actions to be taken may be message based, session based, and/or time based. The following user-configurable settings may be implemented for the actions:

Message based: save all messages for a communication session, save last 'x' number of messages from the communication session, save no messages from the communication session;

Time based: save messages that are displayed on screen for less than 'x' seconds/minutes (e.g., messages displayed on the screen for greater than one minute are considered "read" and will not be saved in the temporary file); use average response time for communication to determine whether message has been read (e.g., if average response time for a communication session is less then 20 seconds, and no response message has been transmitted to communication partner for the last 30 seconds, then consider last received message to be unread); save message containing more than 'x' number of words; and Session-based: save messages for all communication sessions; save messages for selected communication sessions.

The user configurable settings may include combinations of the above time-based, message-based, and event-based criteria. For example, a selected setting may include saving the last 5 messages when a system failure occurs.

The message recovery application 110 may track these activities using the data provided in the temporary file (e.g., SESSION_FILE, SESSION_START_TIME 302, USER_ID 302, EVENT flag 304, EVENT_TIME 306, MESSAGE_TIME 308, and MESSAGE_TEXT 310, e.g., using word count).

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-implemented method for providing autonomic recovery of messages, comprising:
    creating a temporary file for a communication session, the temporary file accessible to a messaging client, and the temporary file identifying a communication partner to the communication session, via the messaging client, and a start time of the communication session, the communication session is implemented via one of an instant messaging application and a text messaging application;
    monitoring the communication session;
    defining a triggering event and actions to be taken in response to the triggering event via user-configurable settings, the actions to be taken including a message-based action, the message-based action selectable as one of a plurality of message-based actions including saving all messages for the communication session, saving selected messages for the communication session, and saving no messages for the communication session;
    upon the occurrence of the triggering event
        logging the time of the triggering event in the temporary file;
        logging the time of any messages received after the time of the triggering event; and
        storing the messages in the temporary file; and
    presenting the messages in response to initiation of another communication session with the communication partner, the other communication session implemented via corresponding one of the instant messaging application and the text messaging application;

wherein the user-configurable settings specify an action to be taken for received but unread messages for the communication session.

2. The computer-implemented method of claim 1, further comprising:
storing the triggering event and the selected actions in the temporary file, the triggering event including at least one of:
idle for a pre-defined time;
a system failure;
an application failure;
an application log off; and
a system log off.

3. The computer-implemented method of claim 2, wherein the actions to be taken further include one of:
a time-based action; and
a session-based action.

4. The computer-implemented method of claim 3, wherein the time-based action includes saving messages that are displayed on a computer screen for less than a threshold period of time.

5. The computer-implemented method of claim 3, wherein the session-based action includes at least one of:
saving messages for all sessions;
saving messages for selected sessions; and
saving no messages for any session.

6. The computer-implemented method of claim 3, wherein the time-based action includes calculating an average response time for messages of a communication session and saving the last received message when no response is transmitted to the communication partner within a threshold period of time based on the average response time.

7. A system for providing autonomic recovery of messages, comprising:
a user system implementing a messaging client; and
a message recovery application executing on the user system, the message recovery application implementing a method, comprising:
creating a temporary file for a communication session, the temporary file accessible to the messaging client, and the temporary file identifying a communication partner to the communication session, via the messaging client, and a start time of the communication session, the communication session is implemented via one of an instant messaging application and a text messaging application;
monitoring the communication session;
defining a triggering event and actions to be taken in response to the triggering event via user-configurable settings, the actions to be taken including a message-based action, the message-based action selectable as one of a plurality of message-based actions including saving all messages for the communication session, saving selected messages for the communication session, and saving no messages for the communication session;
upon the occurrence of the triggering event:
logging the time of the triggering event in the temporary file;
logging the time of any messages received after the time of the triggering event; and
storing the messages in the temporary file; and
presenting the messages in response to initiation of another communication session with the communication partner, the other communication session implemented via corresponding one of the instant messaging application and the text messaging application;

wherein the user-configurable settings specify an action to be taken for received but unread messages for the communication session.

8. The system of claim 7, wherein the message recovery application further performs:
storing the triggering event and the selected actions in the temporary file, the triggering event including at least one of:
idle for pre-defined time;
a system failure;
an application failure;
an application log off; and
a system log off.

9. The system of claim 8, wherein the actions to be taken further include one of:
a time-based action; and
a session-based action.

10. The system of claim 9, wherein the time-based action includes at least one of:
saving messages that are displayed on a computer screen for less than a threshold period of time; and
calculating an average response time for messages of a communication session and saving the last received message when no response is transmitted to the communication partner within a threshold period of time based on the average response time.

11. The system of claim 9, wherein the session-based action includes at least one of:
saving messages for all sessions;
saving messages for selected sessions; and
saving no messages for any session.

12. A computer program product for providing autonomic recovery of messages, the computer program product comprising a non-transitory computer storage medium having instructions embodied thereon, which when executed by a computer cause the computer to implement a method, the method comprising:
creating a temporary file for a communication session, the temporary file accessible to a messaging client, and the temporary file identifying a communication partner to the communication session, via the messaging client, and a start time of the communication session, the communication session is implemented via one of an instant messaging application and a text messaging application;
monitoring the communication session;
defining a triggering event and actions to be taken in response to the triggering event via user-configurable settings, the actions to be taken including a message-based action, the message-based action selectable as one of a plurality of message-based actions including saving all messages for the communication session, saving selected messages for the communication session, and saving no messages for the communication session;
upon the occurrence of the triggering event:
logging the time of the triggering event in the temporary file;
logging the time of any messages received after the time of the triggering event; and
storing the messages in the temporary file; and
presenting the messages in response to initiation of another communication session with the communication partner, the other communication session implemented via corresponding one of the instant messaging application and the text messaging application;
wherein the user-configurable settings specify an action to be taken for received but unread messages for the communication session.

13. The computer program product of claim 12, further comprising instructions for performing:
   storing the triggering event and the selected actions in the temporary file, the triggering event including at least one of:
   idle for pre-defined time;
   a system failure;
   an application failure;
   an application log off; and
   a system log off.

14. The computer program product of claim 13, wherein the actions to be taken further include one of:
   a time-based action; and
   a session-based action.

15. The computer program product of claim 14, wherein the time-based action includes saving messages that are displayed on a computer screen for less than a threshold period of time.

16. The computer program product of claim 14, wherein the session-based action includes at least one of:
   saving messages for all sessions;
   saving messages for selected sessions; and
   saving no messages for any session.

17. The computer program product of claim 14, wherein the time-based action includes calculating an average response time for messages of a communication session and saving the last received message when no response is transmitted to the communication partner within a threshold period of time based on the average response time.

* * * * *